United States Patent
Kong et al.

(10) Patent No.: US 11,404,795 B2
(45) Date of Patent: Aug. 2, 2022

(54) LIQUID CRYSTAL ANTENNA AND MANUFACTURING METHOD AND DRIVING METHOD THEREOF, AND COMMUNICATION DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xiangzhong Kong, Beijing (CN); Tien Lun Ting, Beijing (CN); Lei Wang, Beijing (CN); Ken Wen, Beijing (CN); Tuo Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 334 days.

(21) Appl. No.: 16/612,093

(22) PCT Filed: Apr. 23, 2019

(86) PCT No.: PCT/CN2019/083903
§ 371 (c)(1),
(2) Date: Nov. 8, 2019

(87) PCT Pub. No.: WO2019/218848
PCT Pub. Date: Nov. 21, 2019

(65) Prior Publication Data
US 2021/0364832 A1 Nov. 25, 2021

(30) Foreign Application Priority Data
May 17, 2018 (CN) .......................... 201810474428.8

(51) Int. Cl.
*H01Q 1/48* (2006.01)
*H01Q 21/06* (2006.01)
(Continued)

(52) U.S. Cl.
CPC ............. *H01Q 21/065* (2013.01); *H01Q 1/48* (2013.01); *H01Q 9/045* (2013.01); *G02F 1/1313* (2013.01)

(58) Field of Classification Search
CPC ........ G02F 1/1313; H01Q 1/48; H01Q 9/045; H01Q 21/065
See application file for complete search history.

(56) References Cited

U.S. PATENT DOCUMENTS

2018/0294557 A1 10/2018 Lu et al.
2019/0020365 A1 1/2019 Ouyang et al.

FOREIGN PATENT DOCUMENTS

| CN | 104409852 A | 3/2015 |
|---|---|---|
| CN | 106299627 A | 1/2017 |

(Continued)

OTHER PUBLICATIONS

International Search Report of PCT/CN2019/083903 in Chinese, dated Jul. 19, 2019, with English translation.
(Continued)

*Primary Examiner* — Dieu Hien T Duong
(74) *Attorney, Agent, or Firm* — Collard & Roe, P.C.

(57) ABSTRACT

A liquid crystal antenna, a manufacturing method and a driving method thereof, and a communication device are disclosed. The liquid crystal antenna includes a first substrate and a second substrate provided opposite to each other, a liquid crystal layer, a plurality of microstrip patch antenna structures and a ground electrode. The liquid crystal layer and the plurality of microstrip patch antenna structures are located between the first substrate and the second substrate;
(Continued)

the ground electrode is located on a side of the first substrate away from the liquid crystal layer. Each of the plurality of microstrip patch antenna structures is configured to receive a voltage signal that controls deflection of liquid crystal molecules in the liquid crystal layer and to receive or transmit a microwave signal.

18 Claims, 8 Drawing Sheets

(51) Int. Cl.
  *H01Q 9/04* (2006.01)
  *G02F 1/13* (2006.01)

(56) References Cited

FOREIGN PATENT DOCUMENTS

| | | |
|---|---|---|
| CN | 106450765 A | 2/2017 |
| CN | 106961008 A | 7/2017 |
| CN | 206349494 U | 7/2017 |
| CN | 206422227 U | 8/2017 |
| CN | 107394318 A | 11/2017 |
| CN | 108666738 A | 10/2018 |
| EP | 0 296 838 A2 | 12/1988 |
| JP | 2008-035424 A | 2/2008 |

OTHER PUBLICATIONS

Chinese Office Action in Chinese Application No. 201810474428.8, dated Jun. 24, 2019 with English translation.

respectively applying a first preset drive voltage and a second preset drive voltage to the microstrip patch antenna structures and a ground electrode, to drive liquid crystal molecules of a liquid crystal layer to deflect, to obtain a first resonant frequency and a second resonant frequency of the microstrip patch antenna structures corresponding to a maximum value and a minimum value of a dielectric constant of the liquid crystal molecules ⸺S901 feeding a microwave signal having a frequency of the first resonant frequency, and applying the first preset drive voltage to at least a part of the plurality of microstrip patch antenna structures according to a shape of a shaped beam to be formed, so that those of the plurality of microstrip patch antenna structures whose resonant frequencies are at the first resonant frequency are in an ON state, and those of the plurality of microstrip patch antenna structures whose resonant frequencies are at the second resonant frequency are in an OFF state; or, feeding a microwave signal having a frequency of the second resonant frequency, and applying the second preset drive voltage to at least a part of the plurality of microstrip patch antenna structures according to the shape of the shaped beam to be formed, so that those of the plurality of microstrip patch antenna structures whose resonant frequencies are at the second resonant frequency are in an ON state, and those of the plurality of microstrip patch antenna structures whose resonant frequencies are at the first resonant frequency are in an OFF state ⸺S902

FIG. 9

LIQUID CRYSTAL ANTENNA AND MANUFACTURING METHOD AND DRIVING METHOD THEREOF, AND COMMUNICATION DEVICE

CROSS REFERENCE TO RELATED APPLICATIONS

This application is the National Stage of PCT/CN2019/083903 filed on Apr. 23, 2019, which claims priority under 35 U.S.C. § 119 of Chinese Application No. 201810474428.8 filed on May 17, 2018, the disclosure of which is incorporated by reference.

TECHNICAL FIELD

Embodiments of the present disclosure relate to a liquid crystal antenna, a manufacturing method of the liquid crystal antenna, a driving method of the liquid crystal antenna, and a communication device.

BACKGROUND

A multibeam antenna refers to an antenna that can generate a plurality of sharp beams, and these sharp beams (or referred to as meta beams) may be synthesized into one or several shaped beams, to cover a specific airspace. The multibeam antenna has three basic forms: a lenticular type, a reflecting surface type, and a phased array type; in addition, there is a mixed form with a phased array used as a reflecting surface or a lens feed. All of these conventional multibeam antennas are provided with a plurality of feeds, to correspondingly form a plurality of meta beams of different directions and to control excitation amplitudes and phases of the respective feeds, so that these meta beams are synthesized into a shaped beam having a specific shape. Control of the excitation amplitudes of the respective feeds is implemented by employing a beamforming network that consists primarily of a variable power splitter and a phase shifter, and can excite desired amplitudes and phase distribution to a feed array.

SUMMARY

At least one embodiment of the present disclosure provides a liquid crystal antenna, which includes: a first substrate; a second substrate, opposite to the first substrate; a liquid crystal layer, located between the first substrate and the second substrate; a plurality of microstrip patch antenna structures, located between the first substrate and the second substrate; and a ground electrode, located on a side of the first substrate away from the liquid crystal layer, each of the plurality of microstrip patch antenna structures is configured to receive a voltage signal that controls deflection of liquid crystal molecules in the liquid crystal layer, and to receive or transmit a microwave signal.

For example, in the liquid crystal antenna provided by an embodiment of the present disclosure, a film layer where the plurality of microstrip patch antenna structures are located is located between the first substrate and the liquid crystal layer.

For example, in the liquid crystal antenna provided by an embodiment of the present disclosure, a film layer where the plurality of microstrip patch antenna structures are located is provided between the second substrate and the liquid crystal layer.

For example, in the liquid crystal antenna provided by an embodiment of the present disclosure, the plurality of microstrip patch antenna structures are arranged in a matrix.

For example, in the liquid crystal antenna provided by an embodiment of the present disclosure, each of the plurality of microstrip patch antenna structures comprises a hollow structure.

For example, in the liquid crystal antenna provided by an embodiment of the present disclosure, the hollow structure comprises a plurality of hollow sub-structures arranged in a row direction.

For example, in the liquid crystal antenna provided by an embodiment of the present disclosure, the plurality of hollow sub-structures have a same shape.

For example, in the liquid crystal antenna provided by an embodiment of the present disclosure, each of the plurality of hollow sub-structures is composed of a sub-structure having an "I" shape in a column direction and having an "H" shape in a row direction.

For example, in the liquid crystal antenna provided by an embodiment of the present disclosure, each of the plurality of hollow sub-structures has a shape of two consecutive rectangles arranged in the column direction.

For example, in the liquid crystal antenna provided by an embodiment of the present disclosure, the hollow structure comprises: an outer frame portion; and two hollow sub-portions, located inside the outer frame portion; the outer frame portion comprises a first edge and a second edge extending in a first direction, and a third edge and a fourth edge extending in a second direction perpendicular to the first direction; the first edge, the third edge, the second edge, and the fourth edge are connected head to tail to form the outer frame portion; and the two hollow sub-portions are arranged in the first direction.

For example, in the liquid crystal antenna provided by an embodiment of the present disclosure, each of the hollow sub-portions comprises: a first strip-shaped hollow portion, extending in the second direction and having an interval respectively with the first edge and the second edge; two second strip-shaped hollow portions, extending in the second direction and extending to the first edge and the second edge; a first strip-shaped connecting portion, extending in the first direction and connecting the first strip-shaped hollow portion with the third edge or the fourth edge; and a second strip-shaped connecting portion, extending in the first direction, located between the two second strip-shaped hollow portions, and connecting the two second strip-shaped hollow portions.

For example, in the liquid crystal antenna provided by an embodiment of the present disclosure, an orthogonal projection of the first strip-shaped connecting portion on the first strip-shaped hollow portion is located in a middle portion of the first strip-shaped hollow portion, and an orthogonal projection of the second strip-shaped connecting portion on the second strip-shaped hollow portion is located in a middle portion of the second strip-shaped hollow portion.

For example, in the liquid crystal antenna provided by an embodiment of the present disclosure, each of the hollow sub-portions comprises: a third strip-shaped hollow portion, extending in the second direction and extending to the first edge and the second edge; and a third strip-shaped connecting portion, extending in the first direction and connecting the third strip-shaped hollow portion with the third edge or the fourth edge.

For example, in the liquid crystal antenna provided by an embodiment of the present disclosure, an orthogonal projection of the third strip-shaped connecting portion on the third strip-shaped hollow portion is located in a middle portion of the third strip-shaped hollow portion.

At least one embodiment of the present disclosure provides a communication device, comprising any one of the abovementioned liquid crystal antenna.

At least one embodiment of the present disclosure provides a manufacturing method of a liquid crystal antenna, comprising: providing a first substrate and a second substrate; providing the first substrate and the second substrate opposite to each other; forming a liquid crystal layer and a plurality of microstrip patch antenna structures between the first substrate and the second substrate; and forming a ground electrode on a side of the first substrate that is away from the liquid crystal layer, each of the plurality of microstrip patch antenna structures is configured to receive a voltage signal that controls deflection of liquid crystal molecules in the liquid crystal layer and to receive or transmit a microwave signal.

For example, in the liquid crystal antenna provided by an embodiment of the present disclosure, the plurality of microstrip patch antenna structures are arranged in a matrix.

At least one embodiment of the present disclosure provides a driving method of any one of the abovementioned liquid crystal antenna, comprising: applying a first preset drive voltage and a second preset drive voltage to the plurality of microstrip patch antenna structures and the ground electrode, to obtain a first resonant frequency and a second resonant frequency of each of the plurality of microstrip patch antenna structures corresponding to a maximum value and a minimum value of a dielectric constant of the liquid crystal molecules; feeding a microwave signal having a frequency of the first resonant frequency, and applying the first preset drive voltage to at least a part of the plurality of microstrip patch antenna structures according to a shape of a shaped beam to be formed, so that those of the plurality of microstrip patch antenna structures whose resonant frequencies are at the first resonant frequency are in an ON state, and those of the plurality of microstrip patch antenna structures whose resonant frequencies are at the second resonant frequency are in an OFF state; or, feeding a microwave signal having a frequency of the second resonant frequency, and applying the second preset drive voltage to at least a part of the plurality of microstrip patch antenna structures according to the shape of the shaped beam to be formed, so that those of the plurality of microstrip patch antenna structures whose resonant frequencies are at the second resonant frequency are in an ON state, and those of the plurality of microstrip patch antenna structures whose resonant frequencies are at the first resonant frequency are in an OFF state.

For example, in the driving method provided by an embodiment of the present disclosure, the first preset drive voltage is applied to the plurality of microstrip patch antenna structures and the ground electrode, resonant frequencies of the plurality of microstrip patch antenna structures are the first resonant frequency; the second preset drive voltage is applied to the plurality of microstrip patch antenna structures and the ground electrode, and resonant frequencies of the plurality of microstrip patch antenna structures are the second resonant frequency.

For example, in the driving method provided by an embodiment of the present disclosure, a difference between the first resonant frequency and the second resonant frequency is greater than 500 MHz.

BRIEF DESCRIPTION OF THE DRAWINGS

In order to clearly illustrate the technical solution of embodiments of the present disclosure, the drawings of the embodiments will be briefly described in the following; it is obvious that the drawings in the description are only related to some embodiments of the present disclosure and not limited to the present disclosure.

FIG. 9 is a flow chart of a driving method of another liquid crystal antenna provided by an embodiment of the present disclosure.

DETAILED DESCRIPTION

Figure 1:
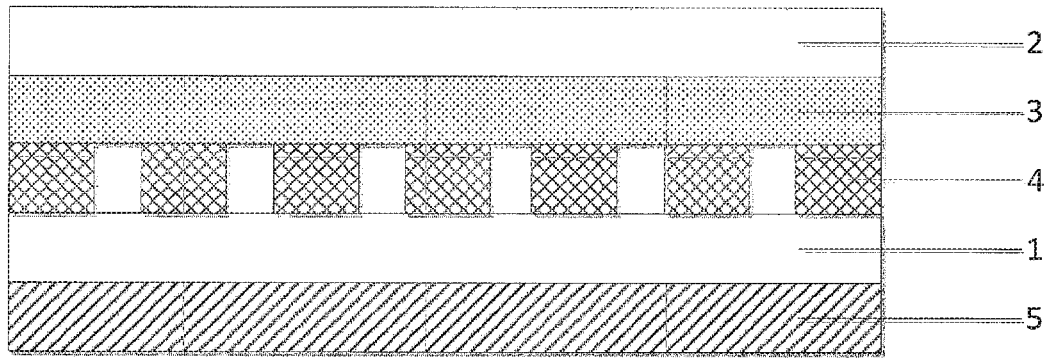
FIG. 1 is a structural schematic diagram of a liquid crystal antenna provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

A current multibeam antenna has a relatively complicated structure and high costs, and is hard to integrate, which is not favorable for promotion and batch application of the multibeam antenna.

Embodiments of the present disclosure provide a liquid crystal antenna and a manufacturing method and a driving method thereof, and a communication device. The liquid crystal antenna comprises a first substrate and a second substrate provided opposite to each other, a liquid crystal layer, a plurality of microstrip patch antenna structures and a ground electrode. The liquid crystal layer and the plurality of microstrip patch antenna structures are located between the first substrate and the second substrate; the ground electrode is located on a side of the first substrate away from the liquid crystal layer. Each of the plurality of microstrip patch antenna structures is configured to receive a voltage signal that controls deflection of liquid crystal molecules in the liquid crystal layer and to receive or transmit a microwave signal. Each of the plurality of microstrip patch antenna structures is equivalent to a resonant switch structure, and a plurality of meta beams generated are formed into a shaped beam having a specific shape by changing the number of microstrip patch antenna structures being turned on or off and spatial position layout of the microstrip patch antenna structures being turned on or off in an array. Therefore, the liquid crystal antenna according to the embodiments of the present disclosure implements multibeam scanning, which has a simple structure and low costs, and is easy to integrate.

Hereinafter, the liquid crystal antenna and the manufacturing method and the driving method thereof, and the communication device provided by the embodiments of the present disclosure will be described in conjunction with the accompanying drawings. It should be noted that, shapes and sizes of respective parts in the accompanying drawings do not reflect true proportions, but are only intended to illustrate contents of the present disclosure.

Figure 2:
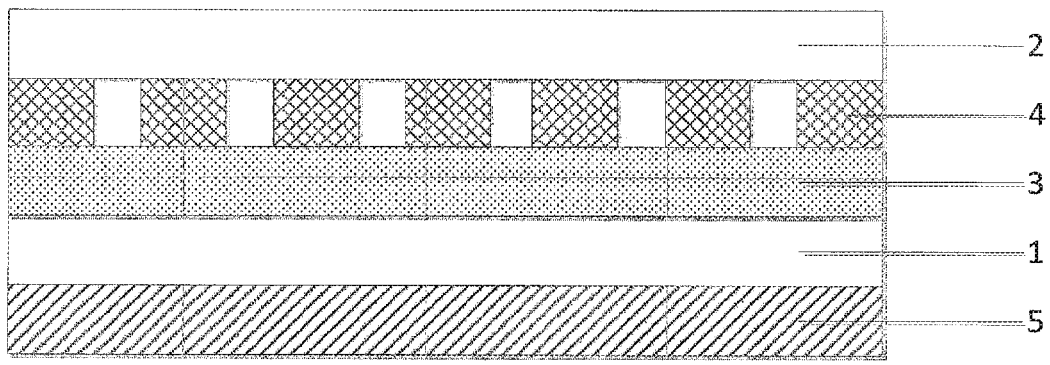
FIG. 2 is a structural schematic diagram of another liquid crystal antenna provided by an embodiment of the present disclosure.

An embodiment of the present disclosure provides a liquid crystal antenna. As illustrated by FIG. 1 and FIG. 2, the liquid crystal antenna comprises: a first substrate 1 and a second substrate 2 provided opposite to each other, a liquid crystal layer 3 and a plurality of microstrip patch antenna structures 4 arranged in a matrix which are located between the first substrate 1 and the second substrate 2, and a ground electrode 5 which is located on a side of the first substrate 1 away from the liquid crystal layer 3. Each of the plurality of microstrip patch antenna structures 4 is configured to receive a voltage signal that controls deflection of liquid crystal molecules in the liquid crystal layer 3 and to receive or transmit a microwave signal.

In the liquid crystal antenna provided by the embodiment of the present disclosure, by providing the liquid crystal layer and the plurality of microstrip patch antenna structures between the first substrate and the second substrate, a preset drive voltage is applied to each of the plurality of microstrip patch antenna structures and the ground electrode, to drive the liquid crystal molecules of the liquid crystal layer to deflect, and to obtain a first resonant frequency and a second resonant frequency of the respective microstrip patch antenna structures corresponding to a maximum value and a minimum value of a dielectric constant of the liquid crystal molecules; upon a microwave signal having a frequency of the first resonant frequency being fed, those of the microstrip patch antenna structures resonating at the first resonant frequency are made in an ON state, to generate a plurality of meta beams, and those of the microstrip patch antenna structures resonating at the second resonant frequency are made in an OFF state; or, upon a microwave signal having a frequency of the second resonant frequency being fed, those of the microstrip patch antenna structures resonating at the second resonant frequency are made in an ON state, to generate a plurality of meta beams, and those of the microstrip patch antenna structures resonating at the first resonant frequency are made in an OFF state; that is, each of the plurality of microstrip patch antenna structures is equivalent to a resonant switch structure, and a plurality of meta beams generated are formed into a shaped beam having a specific shape by changing the number of microstrip patch antenna structures being turned on or off and spatial position layout of the microstrip patch antenna structures being turned on or off in the array. Therefore, the liquid crystal antenna according to the embodiment of the present disclosure implements multibeam scanning, which has a simple structure and low costs, and is easy to integrate.

It should be noted that, the microstrip patch antenna structure and the ground electrode according to the embodiment of the present disclosure both have electrical conductivity, for example, the microstrip patch antenna structure and the ground electrode may be metal layers.

For example, the liquid crystal molecules of the liquid crystal layer, as anisotropic materials, have different dielectric constants along a long axis direction and a short axis direction; and after a deflection voltage is applied across both ends of the liquid crystal molecules, the liquid crystal molecules will deflect, and the dielectric constant of the liquid crystal material also changes with deflection of the liquid crystal; two endpoint values, i.e., a maximum value and a minimum value of the dielectric constant are selected, a corresponding dielectric constant along the long axis direction is the maximum value, and a corresponding dielectric constant along the short axis direction is the minimum value; and thus, the resonant frequency of the microstrip patch antenna structure may be adjusted by liquid crystal deflection; the corresponding resonant frequency of the microstrip patch antenna structure upon the liquid crystal dielectric constant being the maximum value is selected as the first resonant frequency, and the corresponding resonant frequency of the microstrip patch antenna structure upon the liquid crystal dielectric constant being the minimum value is selected as the second resonant frequency; because the dielectric constant of the liquid crystal molecules of the liquid crystal layer cannot be the maximum value and the minimum value at a same time, the resonant frequency of each of the microstrip patch antenna structures cannot be the first resonant frequency and the second resonant frequency at a same time; because a dielectric constant of the liquid crystal molecules of the liquid crystal layer corresponding to each microstrip patch antenna structure can be independently controlled and varied, the resonant frequencies of the respective microstrip patch antenna structures in the array are not the same; some of the resonant frequencies are the first resonant frequency, and some of the resonant frequencies are the second resonant frequency.

For example, each of the plurality of microstrip patch antenna structures is equivalent to a resonant switch structure; upon a microwave signal having a certain frequency-width center frequency as the first resonant frequency being fed, those of the microstrip patch antenna structures resonating at the first resonant frequency radiate the signal and are in an ON state, to generate a plurality of meta beams, and those of the microstrip patch antenna structures resonating at the second resonant frequency are in an OFF state; upon a microwave signal having a certain frequency-width center frequency as the second resonant frequency being fed, those of the microstrip patch antenna structures resonating at the second resonant frequency radiate the signal and are in an ON state, to generate a plurality of meta beams, and the respective microstrip patch antenna structures resonating at the first resonant frequency are in an OFF state; so a plurality of meta beams generated are formed into a shaped beam having a specific shape by changing the number of microstrip patch antenna structures being turned on or off and spatial position layout of the microstrip patch antenna structures being turned on or off in the array. Therefore, the liquid crystal antenna according to the embodiment of the present disclosure implements multibeam scanning, which has a simple structure and low costs, and is easy to integrate.

For example, in some examples, the plurality of microstrip patch antenna structures are arranged in a matrix, to facilitate forming the plurality of meta beams into a shaped beam having a specific shape.

Figure 3:
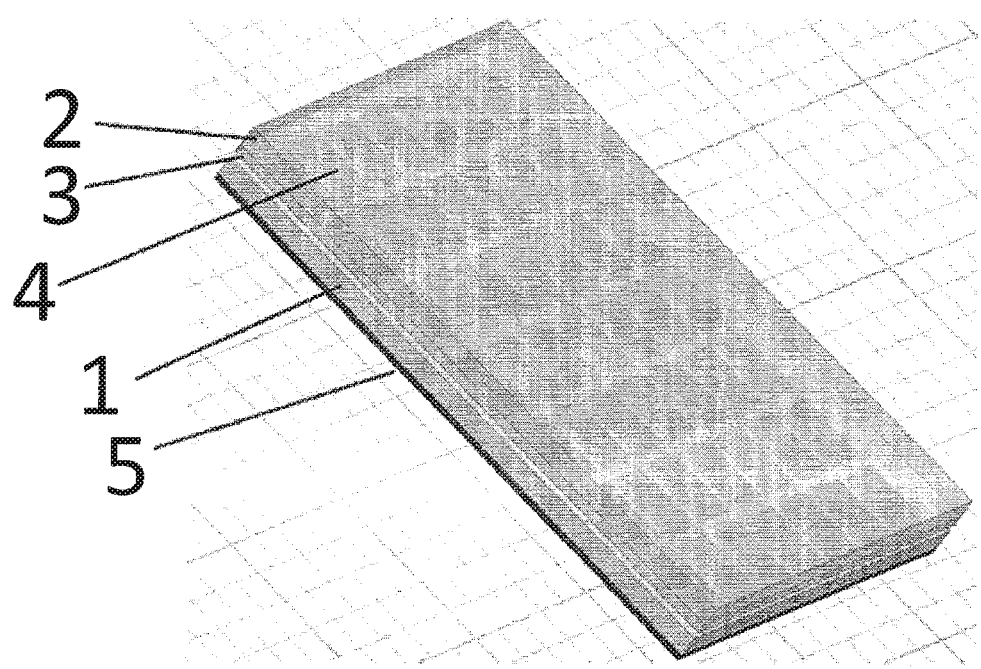
FIG. 3 is a cross-sectional schematic diagram of the liquid crystal antenna shown in FIG. 1.

For example, in the above-described liquid crystal antenna provided by the embodiment of the present disclosure, as illustrated by FIG. 1 and FIG. 3, FIG. 3 is a cross-sectional schematic diagram of the liquid crystal antenna shown in FIG. 1, a film layer where the plurality of microstrip patch antenna structures 4 are located is provided between the first substrate 1 and the liquid crystal layer 3; or, as illustrated by FIG. 2, a film layer where the plurality of microstrip patch antenna structures 4 are located is provided between the second substrate 2 and the liquid crystal layer 3. Both types of structures can implement adjustment of the resonant frequency of the microstrip patch antenna structure 4 by applying a drive voltage between the microstrip patch antenna structure 4 and the ground electrode 5 to control deflection of the liquid crystal molecules of the liquid crystal layer 3; please refer to the above-described contents for a specific adjustment mode.

Figure 4:
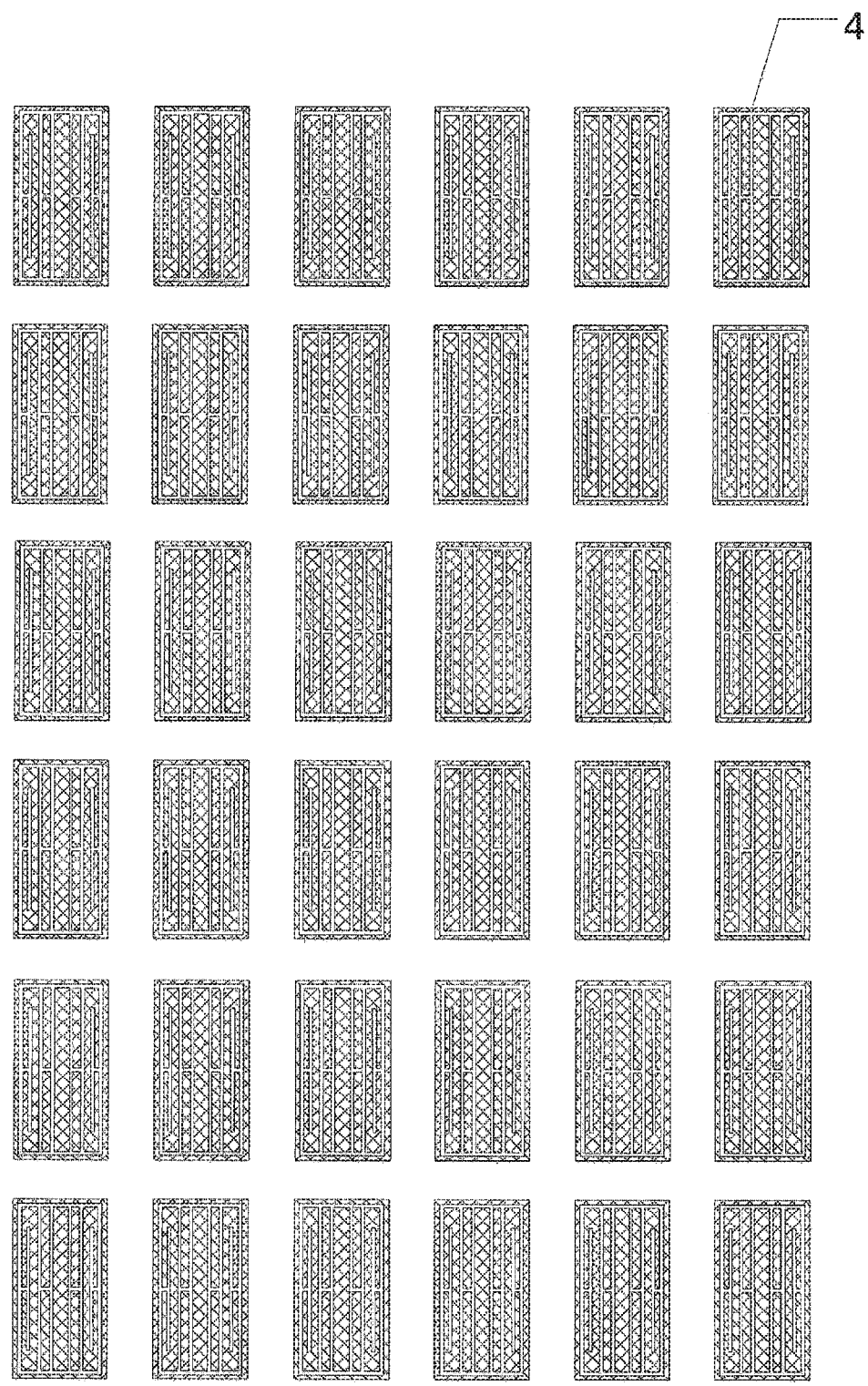
FIG. 4 is a schematic diagram of a plurality of microstrip patch antenna structures arranged in a matrix provided by an embodiment of the present disclosure.
Figure 5:
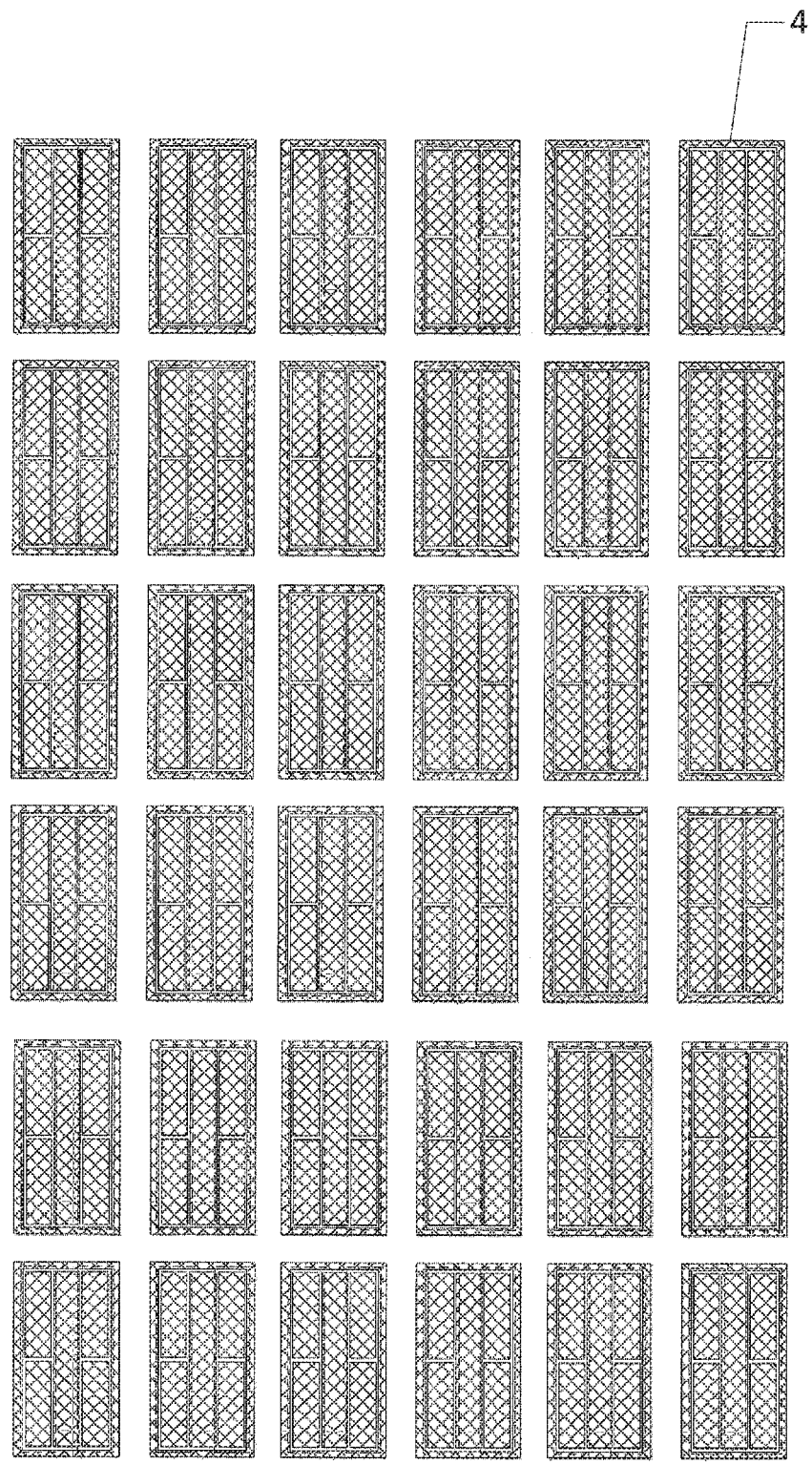
FIG. 5 is a schematic diagram of a plurality of microstrip patch antenna structures of another type arranged in a matrix provided by an embodiment of the present disclosure.
Figure 6:
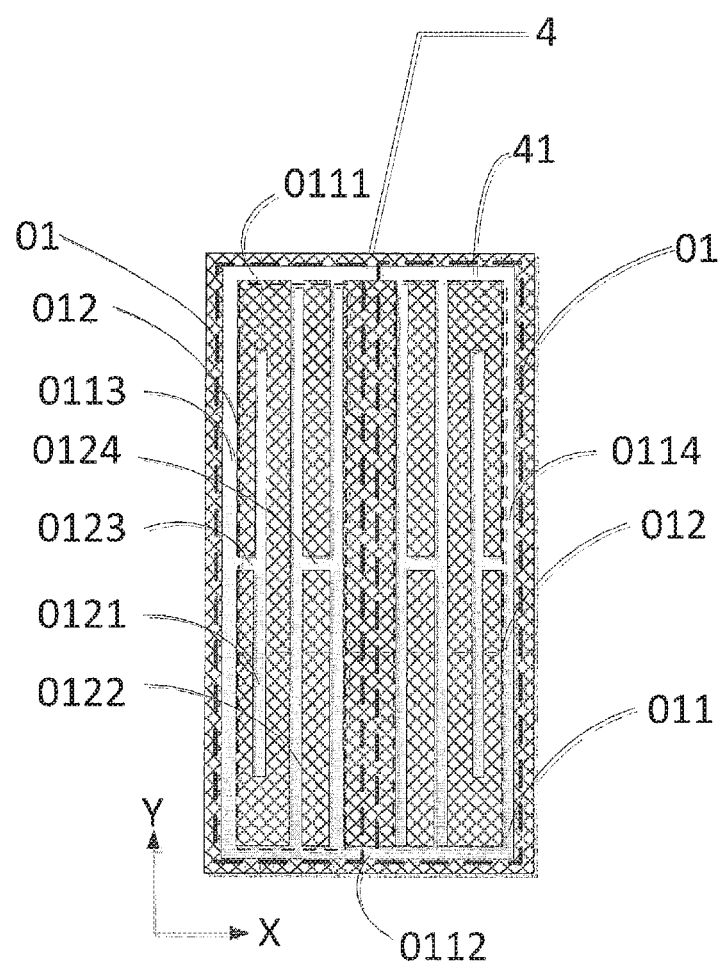
FIG. 6 is a schematic diagram of a single microstrip patch antenna structure shown in FIG. 4.
Figure 7:
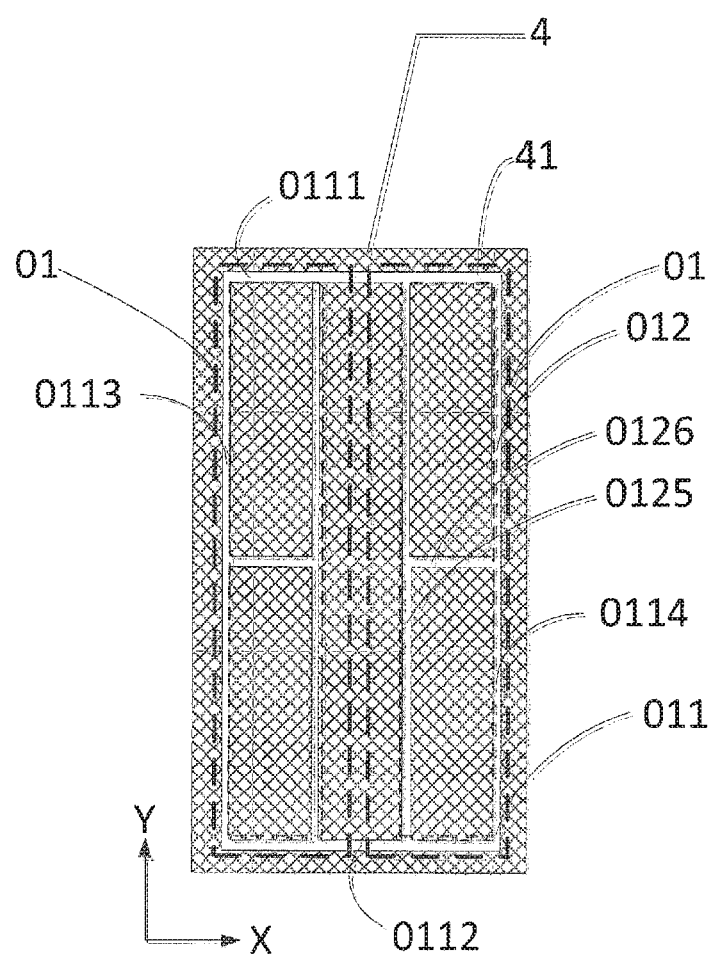
FIG. 7 is a schematic diagram of a single microstrip patch antenna structure shown in FIG. 5.

For example, in the above-described liquid crystal antenna provided by the embodiment of the present disclosure, FIG. 4 and FIG. 5 are respectively schematic diagrams of two types of microstrip patch antenna structures 4 arranged in an array in the liquid crystal antenna provided by the embodiment of the present disclosure, in order to improve a resonance effect of the microstrip patch antenna structure 4, enhance transmission performance of the microwave signal, and improve a gain value of the microstrip patch antenna structure; in the above-described liquid crystal antenna provided by the embodiment of the present disclosure, as illustrated by FIG. 6 and FIG. 7, of which FIG. 6 is a schematic diagram of a single microstrip patch antenna structure 4 shown in FIG. 4, and FIG. 7 is a schematic diagram of a single microstrip patch antenna structure 4 shown in FIG. 5, each of the plurality of microstrip patch antenna structures 4 includes a hollow structure 41 (a white portion in the diagram). In this way, an area occupied by the microstrip patch antenna structures 4 according to the present disclosure can be saved, and more microstrip patch antenna structures 4 can be manufactured in a same space size, which is more favorable for implementing multibeam scanning.

For example, in the above-described liquid crystal antenna provided by the embodiment of the present disclosure, as illustrated by FIG. 6 and FIG. 7, the hollow structure 41 includes a plurality of hollow sub-structures 01 arranged in a row direction X (only two groups are shown in the diagram).

For example, in the above-described liquid crystal antenna provided by the embodiment of the present disclosure, as illustrated by FIG. 6 and FIG. 7, shapes of the respective hollow sub-structures 01 are the same. In this way, it is convenient for manufacture by using a uniform manufacturing process.

For example, in the above-described liquid crystal antenna provided by the embodiment of the present disclosure, as illustrated by FIG. 6, each of the hollow sub-structures 01 is composed of a sub-structure having an "I" shape in a column direction Y and having an "H" shape in the row direction X. For example, in the above-described liquid crystal antenna provided by the embodiment of the present disclosure, as illustrated by FIG. 7, each of the hollow sub-structures 01 has a shape of two consecutive rectangles arranged in the column direction Y.

For example, in some examples, as illustrated by FIG. 6, each of the hollow sub-structures 01 includes an outer frame portion 011 and two hollow sub-portions 012 located inside the outer frame portion 011; the outer frame portion 011 includes a first edge 0111 and a second edge 0112 extending in a first direction and a third edge 0113 and a fourth edge 0114 extending in a second direction perpendicular to the first direction; the first edge 0111, the third edge 0113, the second edge 0112 and the fourth edge 0114 are connected head to tail to form the outer frame portion 011; and the two hollow sub-portions 012 are arranged in the first direction. The first direction may be the X direction and the second direction may be the Y direction.

For example, in some examples, as illustrated by FIG. 6, each of the hollow sub-portions 012 includes: a first strip-shaped hollow portion 0121, two second strip-shaped hollow portions 0122, a first strip-shaped connecting portion 0123, and a second strip-shaped connecting portion 0124. The first strip-shaped hollow portion 0121 extends in the second direction and has an interval respectively with the first edge 0111 and the second edge 0112, that is to say, the first strip-shaped hollow portion 0121 is not connected with the first edge 0111 and the second edge 0112; the two second strip-shaped hollow portions 0122 extend in the second direction and extend to the first edge 0111 and the second edge 0112; the first strip-shaped connecting portion 0123 extends in the first direction and connects the first strip-shaped hollow portion 0121 with the third edge 0113 or the fourth edge 0114; and the second strip-shaped connecting portion 0124 extends in the first direction, located between the two second strip-shaped hollow portions 0122, and connects the two second strip-shaped hollow portions 0122.

For example, in some examples, as illustrated by FIG. 6, an orthogonal projection of the first strip-shaped connecting portion 0123 on the first strip-shaped hollow portion 0121 is located in a middle portion of the first strip-shaped hollow portion 0121, and an orthogonal projection of the second strip-shaped connecting portion 0124 on the second strip-shaped hollow portion 0122 is located in a middle portion of the second strip-shaped hollow portion 0122.

For example, in some examples, as illustrated by FIG. 7, each of the hollow sub-portions 012 includes: a third strip-shaped hollow portion 0125, extending in the second direction and extending to the first edge 0111 and the second edge 0112; and a third strip-shaped connecting portion 0126, extending in the first direction and connecting the third strip-shaped hollow portion 0125 with the third edge 0113 or the fourth edge 0114.

For example, in some examples, as illustrated by FIG. 7, an orthogonal projection of the third strip-shaped connecting portion 0126 on the third strip-shaped hollow portion 1025 is located in a middle portion of the third strip-shaped hollow portion 0125. Of course, upon being specifically implemented, the respective hollow sub-portions are not limited to the above-described structures provided by the embodiment of the present disclosure, other types of hollow structures may be provided, and the microstrip patch antenna structures are all within the scope of the present disclosure as long as they include a hollow structure, which will not be limited here.

It should be noted that, in the embodiment of the present disclosure, both the first substrate and the second substrate may be transparent substrates, which may be made of non-metallic photoconductive materials with certain sturdiness such as glass, quartz and transparent resin, etc.

Based on a same inventive concept, an embodiment of the present disclosure further provides a communication device, comprising the above-described liquid crystal antenna provided by the embodiment of the present disclosure. The communication device may be a satellite communication system or the like.

Figure 8:
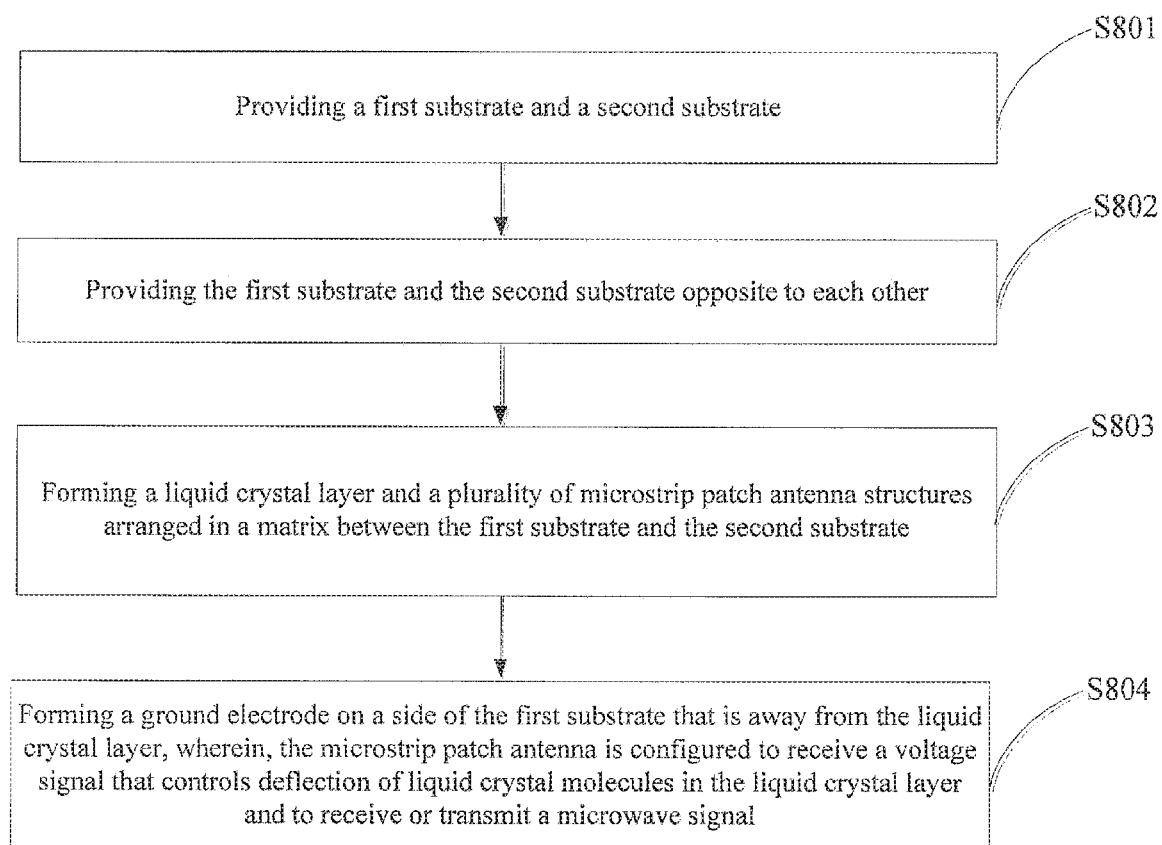
FIG. 8 is a flow chart of a manufacturing method of a liquid crystal antenna provided by an embodiment of the present disclosure.

Based on a same inventive concept, an embodiment of the present disclosure further provides a manufacturing method of a liquid crystal antenna. As illustrated by FIG. 8, the manufacturing method of the liquid crystal antenna comprises:

Step S801: providing a first substrate and a second substrate.

Step S802: providing the first substrate and the second substrate opposite to each other.

Step S803: forming a liquid crystal layer and a plurality of microstrip patch antenna structures between the first substrate and the second substrate.

Step S804: forming a ground electrode on a side of the first substrate that is away from the liquid crystal layer, each of the plurality of microstrip patch antenna structures is configured to receive a voltage signal that controls deflection of liquid crystal molecules in the liquid crystal layer and to receive or transmit a microwave signal.

Based on a same inventive concept, an embodiment of the present disclosure further provides a driving method of a liquid crystal antenna, as illustrated by FIG. 9, comprising:

Step S901: respectively applying a first preset drive voltage and a second preset drive voltage to the microstrip patch antenna structures and a ground electrode, to drive liquid crystal molecules of a liquid crystal layer to deflect, to obtain a first resonant frequency and a second resonant frequency of the microstrip patch antenna structures corresponding to a maximum value and a minimum value of a dielectric constant of the liquid crystal molecules.

For example, the ground electrode may be grounded, and then the first preset drive voltage or the second preset drive voltage may be applied to the microstrip patch antenna structure; for example, the second preset drive voltage may be zero.

Step S902: feeding a microwave signal having a frequency of the first resonant frequency, and applying the first preset drive voltage to at least a part of the plurality of microstrip patch antenna structures according to a shape of a shaped beam to be formed, so that those of the plurality of microstrip patch antenna structures whose resonant frequencies are at the first resonant frequency are in an ON state, and those of the plurality of microstrip patch antenna structures whose resonant frequencies are at the second resonant frequency are in an OFF state; or, feeding a microwave signal having a frequency of the second resonant frequency, and applying the second preset drive voltage to at least a part of the plurality of microstrip patch antenna structures according to the shape of the shaped beam to be formed, so that those of the plurality of microstrip patch antenna structures whose resonant frequencies are at the second resonant frequency are in an ON state, and those of the plurality of microstrip patch antenna structures whose resonant frequencies are at the first resonant frequency are in an OFF state.

For example, in some examples, the first preset drive voltage is applied to the plurality of microstrip patch antenna structures and the ground electrode, the resonant frequencies of the plurality of microstrip patch antenna structures are the first resonant frequency; the second preset drive voltage is applied to the plurality of microstrip patch antenna structures and the ground electrode, and the resonant frequencies of the plurality of microstrip patch antenna structures are the second resonant frequency.

For example, in some examples, a difference between the first resonant frequency and the second resonant frequency is greater than 500 MHz to facilitate separation of the first resonant frequency and the second resonant frequency.

For example, according to the shape of the shaped beam to be formed, upon the microwave signal having the frequency of the first resonant frequency being fed, the microstrip patch antenna structures resonating at the first resonant frequency are made in an ON state, and the microstrip patch antenna structures resonating at the second resonant frequency are made in an OFF state; or, upon the microwave signal having the frequency of the second resonant frequency being fed, the microstrip patch antenna structures resonating at the second resonant frequency are made in an ON state, and the microstrip patch antenna structures resonating at the first resonant frequency are made in an OFF state.

In the liquid crystal antenna and the manufacturing method and the driving method thereof, and the communication device provided by the embodiments of the present disclosure, by providing the liquid crystal layer and the plurality of microstrip patch antenna structures arranged in a matrix between the first substrate and the second substrate, the preset drive voltage is applied to the plurality of microstrip patch antenna structures and the ground electrode, to drive the liquid crystal molecules of the liquid crystal layer to deflect, and to obtain the first resonant frequency and the second resonant frequency of the plurality of microstrip patch antenna structures corresponding to the maximum value and the minimum value of the dielectric constant of the liquid crystal molecules; upon the microwave signal having the frequency of the first resonant frequency being fed, those of the plurality of microstrip patch antenna structures resonating at the first resonant frequency are made in an ON state, to generate a plurality of meta beams, and those of the plurality of microstrip patch antenna structures resonating at the second resonant frequency are made in an OFF state; or, upon the microwave signal having the frequency of the second resonant frequency being fed, those of the plurality of microstrip patch antenna structures resonating at the second resonant frequency are made in an ON state, to generate a plurality of meta beams, and those of the plurality of microstrip patch antenna structures resonating at the first resonant frequency are made in an OFF state; that is, each of the plurality of microstrip patch antenna structures is equivalent to a resonant switch structure, and a plurality of meta beams generated are formed into a shaped beam having a specific shape by changing the number of microstrip patch antenna structures being turned on or off and spatial position layout of the same being turned on or off in the array. Therefore, the liquid crystal antenna according to the embodiment of the present disclosure implements multibeam scanning, which has a simple structure and low costs, and is easy to integrate.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto, the protection scope of the present disclosure should be based on the protection scope of the claims.

What is claimed is:

1. A liquid crystal antenna, comprising:
    a first substrate;
    a second substrate, opposite to the first substrate;
    a liquid crystal layer, located between the first substrate and the second substrate;
    a plurality of microstrip patch antenna structures, located between the first substrate and the second substrate; and
    a ground electrode, located on a side of the first substrate away from the liquid crystal layer,
    wherein each of the plurality of microstrip patch antenna structures is configured to receive a voltage signal that controls deflection of liquid crystal molecules in the liquid crystal layer, and to receive or transmit a microwave signal,
    each of the plurality of microstrip patch antenna structures comprises a hollow structure, the hollow structure comprises:
    an outer frame portion; and
    two hollow sub-portions, located inside the outer frame portion;
    wherein the outer frame portion comprises a first edge and a second edge extending in a first direction, and a third edge and a fourth edge extending in a second direction perpendicular to the first direction; the first edge, the third edge, the second edge, and the fourth edge are connected head to tail to form the outer frame portion; and the two hollow sub-portions are arranged in the first direction.

2. The liquid crystal antenna according to claim 1, wherein a film layer where the plurality of microstrip patch antenna structures are located is located between the first substrate and the liquid crystal layer.

3. The liquid crystal antenna according to claim 1, wherein a film layer where the plurality of microstrip patch antenna structures are located is provided between the second substrate and the liquid crystal layer.

4. The liquid crystal antenna according to claim 1, wherein the plurality of microstrip patch antenna structures are arranged in a matrix.

5. The liquid crystal antenna according to claim 1, wherein the hollow structure comprises a plurality of hollow sub-structures arranged in a row direction.

6. The liquid crystal antenna according to claim 5, wherein the plurality of hollow sub-structures have a same shape.

7. The liquid crystal antenna according to claim 6, wherein each of the plurality of hollow sub-structures is composed of a sub-structure having an "H" shape, and two parallel parts of the "H" shape are parallel to a column direction.

8. The liquid crystal antenna according to claim 6, wherein each of the plurality of hollow sub-structures has a shape of two consecutive rectangles arranged in the column direction.

9. The liquid crystal antenna according to claim 1, wherein each of the hollow sub-portions comprises:
    a first strip-shaped hollow portion, extending in the second direction and having an interval respectively with the first edge and the second edge;
    two second strip-shaped hollow portions, extending in the second direction and extending to the first edge and the second edge;
    a first strip-shaped connecting portion, extending in the first direction and connecting the first strip-shaped hollow portion with the third edge or the fourth edge; and
    a second strip-shaped connecting portion, extending in the first direction, located between the two second strip-shaped hollow portions, and connecting the two second strip-shaped hollow portions.

10. The liquid crystal antenna according to claim 9, wherein an orthogonal projection of the first strip-shaped connecting portion on the first strip-shaped hollow portion is located in a middle portion of the first strip-shaped hollow portion, and an orthogonal projection of the second strip-shaped connecting portion on the second strip-shaped hollow portion is located in a middle portion of the second strip-shaped hollow portion.

11. The liquid crystal antenna according to claim 1, wherein each of the hollow sub-portions comprises:
    a third strip-shaped hollow portion, extending in the second direction and extending to the first edge and the second edge; and
    a third strip-shaped connecting portion, extending in the first direction and connecting the third strip-shaped hollow portion with the third edge or the fourth edge.

12. The liquid crystal antenna according to claim 11, wherein an orthogonal projection of the third strip-shaped connecting portion on the third strip-shaped hollow portion is located in a middle portion of the third strip-shaped hollow portion.

13. A communication device, comprising the liquid crystal antenna according to claim 1.

14. A manufacturing method of a liquid crystal antenna, comprising:
    providing a first substrate and a second substrate;
    providing the first substrate and the second substrate opposite to each other;
    forming a liquid crystal layer and a plurality of microstrip patch antenna structures between the first substrate and the second substrate; and
    forming a ground electrode on a side of the first substrate that is away from the liquid crystal layer,
    wherein each of the plurality of microstrip patch antenna structures is configured to receive a voltage signal that controls deflection of liquid crystal molecules in the liquid crystal layer and to receive or transmit a microwave signal,
    each of the plurality of microstrip patch antenna structures comprises a hollow structure, the hollow structure comprises:
    an outer frame portion; and
    two hollow sub-portions, located inside the outer frame portion;
    wherein the outer frame portion comprises a first edge and a second edge extending in a first direction, and a third edge and a fourth edge extending in a second direction perpendicular to the first direction; the first edge, the third edge, the second edge, and the fourth edge are connected head to tail to form the outer frame portion; and the two hollow sub-portions are arranged in the first direction.

15. The manufacturing method of the liquid crystal antenna according to claim 14, wherein the plurality of microstrip patch antenna structures are arranged in a matrix.

16. A driving method of a liquid crystal antenna, wherein the liquid crystal antenna comprises a first substrate; a second substrate, opposite to the first substrate; a liquid crystal layer, located between the first substrate and the second substrate; a plurality of microstrip patch antenna structures, located between the first substrate and the second substrate; and a ground electrode, located on a side of the first substrate away from the liquid crystal layer, each of the plurality of microstrip patch antenna structures is configured to receive a voltage signal that controls deflection of liquid crystal molecules in the liquid crystal layer, and to receive or transmit a microwave signal, the driving method comprises:

applying a first preset drive voltage and a second preset drive voltage to the plurality of microstrip patch antenna structures and the ground electrode, to obtain a first resonant frequency and a second resonant frequency of each of the plurality of microstrip patch antenna structures corresponding to a maximum value and a minimum value of a dielectric constant of the liquid crystal molecules;

feeding a microwave signal having a frequency of the first resonant frequency, and applying the first preset drive voltage to at least a part of the plurality of microstrip patch antenna structures according to a shape of a shaped beam to be formed, so that those of the plurality of microstrip patch antenna structures whose resonant frequencies are at the first resonant frequency are in an ON state, and those of the plurality of microstrip patch antenna structures whose resonant frequencies are at the second resonant frequency are in an OFF state; or, feeding a microwave signal having a frequency of the second resonant frequency, and applying the second preset drive voltage to at least a part of the plurality of microstrip patch antenna structures according to the shape of the shaped beam to be formed, so that those of the plurality of microstrip patch antenna structures whose resonant frequencies are at the second resonant frequency are in an ON state, and those of the plurality of microstrip patch antenna structures whose resonant frequencies are at the first resonant frequency are in an OFF state.

17. The driving method according to claim 16, wherein the first preset drive voltage is applied to the plurality of microstrip patch antenna structures and the ground electrode, resonant frequencies of the plurality of microstrip patch antenna structures are the first resonant frequency; the second preset drive voltage is applied to the plurality of microstrip patch antenna structures and the ground electrode, and resonant frequencies of the plurality of microstrip patch antenna structures are the second resonant frequency.

18. The driving method according to claim 16, wherein a difference between the first resonant frequency and the second resonant frequency is greater than 500 MHz.

* * * * *